J. O. HAAS.
PISTON AND RING PACKING.
APPLICATION FILED APR. 1, 1915.
1,229,258.
Patented June 12, 1917.
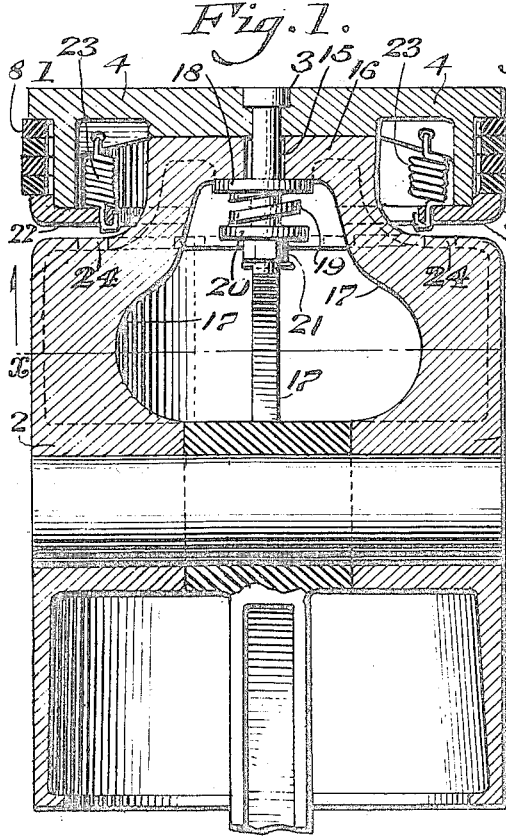
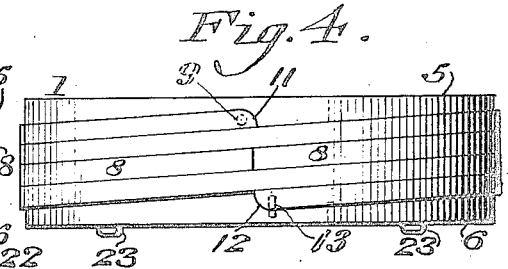
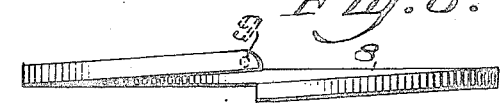
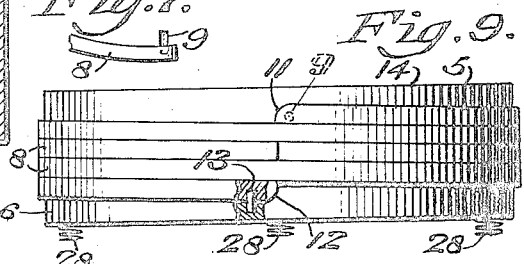
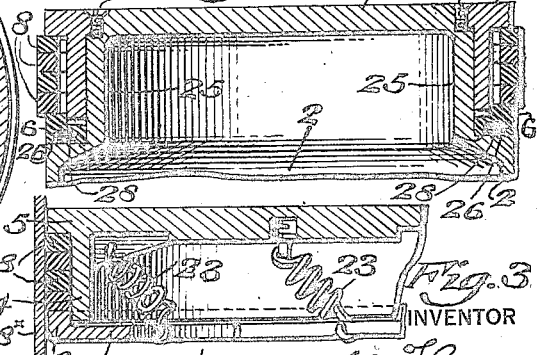
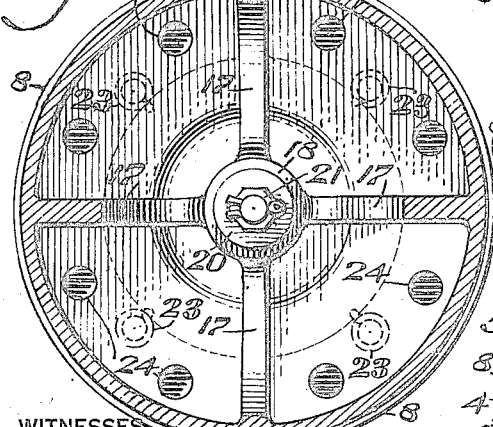
WITNESSES
P. F. Nagle
H. G. Dieterich
INVENTOR
Jackson O. Haas
BY Diedersheim & Fairbank
ATTORNEYS

UNITED STATES PATENT OFFICE.

JACKSON O. HAAS, OF PHILADELPHIA, PENNSYLVANIA.

PISTON AND RING PACKING.

1,229,258.  Specification of Letters Patent.  Patented June 12, 1917.

Application filed April 1, 1915. Serial No. 18,510.

*To all whom it may concern:*

Be it known that I, JACKSON O. HAAS, a citizen of the United States, residing in the city and county of Philadelphia, State of Pennsylvania, have invented a new and useful Piston and Ring Packing, of which the following is a specification.

My invention relates to a piston and ring packing more particularly for an internal combustion engine and consists of spiral rings which are adapted to occupy fully a spiral groove on the head of the piston with their joints broken and contact oil-tight with the cylinder which said piston occupies, while being permitted also to expand as their surfaces wear away in use, while being prevented from shifting in rotary direction, and other advantages are presented as will be hereinafter described.

The invention is satisfactorily illustrated in the accompanying drawing, but the important instrumentalities thereof may be varied, as long as they are included in the scope of the claims.

Figure 1 represents a vertical section of a piston and connected cross head embodying my invention.

Fig. 2 represents a horizontal section looking-up on line $x$—$x$ Fig. 1.

Fig. 3 represents a vertical section of the piston shown in Fig. 1 with the springs employed for connecting the top and bottom thereof in positions different from those in said Fig. 1, as it is in the cylinder.

Fig. 4 represents a side elevation of the piston and the packing rings thereon.

Fig. 5 represents a side elevation of said head with the packing rings removed therefrom.

Fig. 6 represents a side elevation of a packing ring of a single convolution.

Fig. 7 represents a top view of a portion thereof.

Fig. 8 represents a side elevation of a packing ring of a plurality of convolutions, and wound close.

Fig. 9 represents a side elevation similar to Fig. 4 with a modification of springs employed.

Fig. 10 represents a vertical section thereof.

Similar numerals of reference indicate corresponding parts in the figures.

Referring to the drawings, 1 designates a piston, and 2 designates a cross head which is connected therewith by the bolt 3 centrally in said members.

Said piston 1 consists of the cylindrical body 4 and the outturned flange 5 which is integral with the upper end portion or head thereof, and the outturned flange 6 which is loose or freely fitted on the lower portion or head thereof, said flanges being on the exterior of said body and separated forming between them the unbroken groove 7, the walls of which while substantially parallel with each other are inclined with reference to the outer faces of said body and in which groove are fitted the packing rings 8, each of whose convolutions are not shorter than one complete turn of a spiral, as shown in Fig. 6, a number of such rings being preferably employed and imposed directly one on the other, so as to fill the entire space of the groove 4 between the flanges 5 and 6, and their terminals break the joints of the rings one with the other, it being evident that the wearing surfaces of the rings which contact with the cylinder $8^x$, see Fig. 3, are oil-tight and no carbon can pass under or between said rings, and the latter as they wear away on their outer surfaces are adapted to continue their expansion and so be held gas-tight against the cylinder, it being noticed that on the inner end of the beginning of the convolution of the upper ring is the pin or stud 9 which is adapted to enter the opening 10 in the side of the body 4 so as to hold said end of the ring in contact with the shoulder 11 on the side of the upper flange 5, thus preventing shifting of the rings around said body, while permitting expansion of the same for the purpose hereinbefore stated.

On the side of the flange 6 is the shoulder 12 with which abuts the adjacent end of the lower ring, the latter and said flange 6 being connected by the pin or stud 13 which enters the same, thus preventing rotation of the lower flanges 6 and 8 around the body, while permitting expansion of said ring for the purpose hereinbefore stated.

The bolt 3 which is connected with the top 4 of the piston 1, passes through an opening 15 in the top or crown 16 of the cross head 2, said crown being supported on the spider arms 17 of said cross head, it being noticed that said opening 15 is of considerably greater diameter than that of the bolt 3, so that said cross head may have a lateral play on the piston head, and the latter is movable in lateral direction on said cross head. The bolt 3 carries the washer 18 which bears against the underside of the crown of the cross head, said bolt carrying also the spring 19, the washer 20, and the nut 21, said spring being interposed between said washers 18 and 20, and said nut serving to adjust said spring, and consequently the resilient connection of the piston and cross head.

While the piston rests loosely on the cross head, the crown of the latter entering the former, as plainly shown in Fig. 1, the flanged base 22 of the piston may rotate on the body 4 of said piston, but this is limited by the springs 23 which are connected with said base and the top of the piston as shown in Fig. 1, the change of position of said springs due to the rotation of the base 22 is shown in Fig. 3, said springs serving also to connect resiliently the base and top of the piston as is evident.

In the upper part of the cross head are ports 24, shown full in Fig. 2, and dotted in Fig. 1, the same being adapted for the passage of oil and air to lubricate the wall of the cylinder and cool the same.

It will be seen that as the piston is movable laterally mounted on the cross head as has been stated, and said cross head travels up and down in the cylinder, the piston is not influenced by the side pressure of the connecting rod on the cross head and the consequent angularity imparted to said cross head, whereby the tendency of the piston to wear the wall of the cylinder oval is obviated.

In Figs. 9 and 10 I show the top 14 of the piston connected with the cylindrical neck 25 continuous of the cross head 2 and being fitted within the side of the body 4 of said piston. In this instance the bottom flange 6 of the piston rests on the shoulder 26 of the cross head, and said cylindrical portion 25 is connected with the top 14 of the piston by the screws 27. Interposed between the flange 6 and the shoulder 26 are the springs 28.

Having thus described my invention what I claim as new and desire to secure by Letters Patent, is: —

1. A piston formed of a separable top and bottom, having in its side a groove the walls of which are inclined with respect to the opposite ends of said piston, a packing ring adapted to occupy said groove, and a resilient device adapted to connect said bottom and top, and permit the rotation of the latter one on the other.

2. A piston formed of a cylindrical body having on its upper head an outturned flange, a lower head having an outturned flange, said body having between said flanges a groove, the opposite walls of which are substantially parallel with each other and oppositely inclined with respect to the opposite ends of said body, a plurality of spiral rings on said body adapted to occupy said groove with their convolutions in contact with each other, said lower head of the piston being freely mounted on the upper head thereof, and means for rotatingly and resiliently connecting said heads.

3. A piston formed of a cylindrical body having at its upper portion an outturned flange, a lower portion having an outturned flange, said body having between said flanges a groove, the opposite walls of which are substantially parallel with each other and oppositely inclined with respect to the opposite ends of said body, shoulders on the inner edges of said flanges approximately opposite each other, a plurality of spiral rings on said body adapted to occupy said groove with their convolutions in contact with each other, the upper terminal of one of said rings being adapted to abut the adjacent shoulder on the upper flange and to be secured to said flange at said shoulder to prevent shifting of the rings around the body yet permitting expansion thereof, the lower terminal of the other ring being adapted to abut the adjacent shoulder of the lower flange and to be secured to said flange at the shoulder thereof and means permitting limited rotation of the lower flange around said body and allowing expansion of the ring.

JACKSON O. HAAS.

Witnesses:
JOHN A. WIEDERSHEIM,
N. BUSSINGER.